United States Patent Office 2,975,408
Patented Mar. 14, 1961

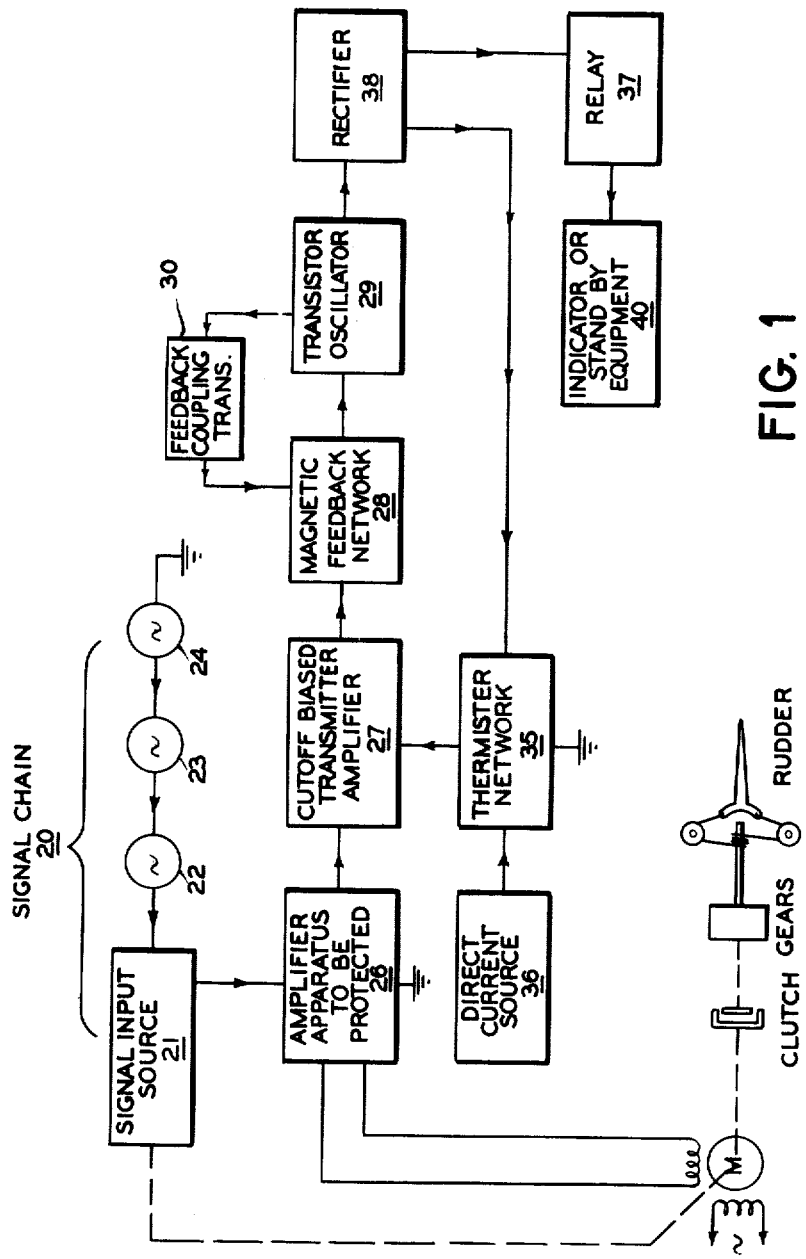

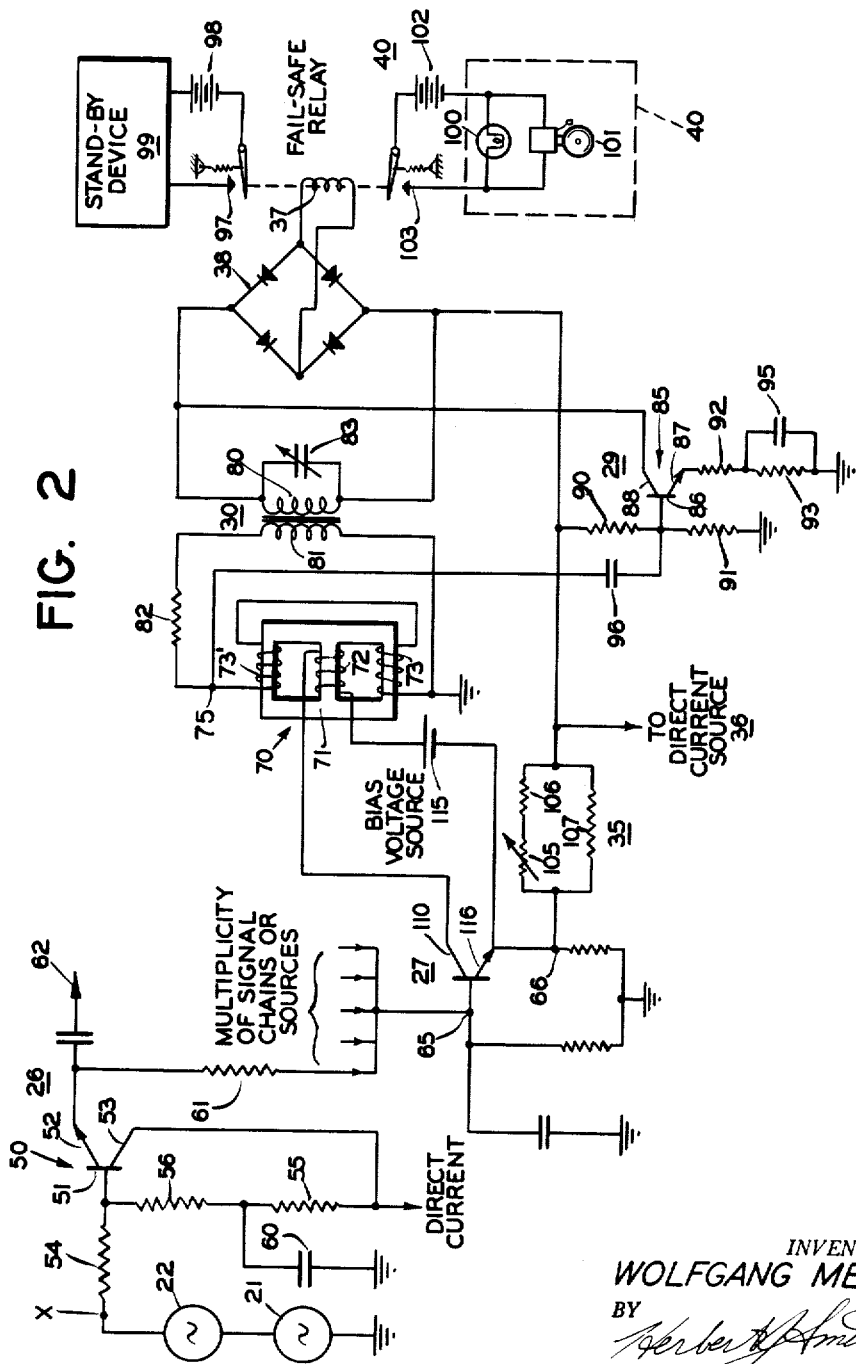

2,975,408
SIGNAL CHAIN WARNING DEVICE

Wolfgang Merel, Newark, N.J., assignor to The Bendix Corporation, a corporation of Delaware Filed June 6, 1956, Ser. No. 589,748

3 Claims. (Cl. 340—253)

This invention relates to control systems and apparatus, and more particularly to systems and apparatus wherein a fault or open circuit condition of a signal source will actuate an indicator standby device, auxiliary control circuit, or other equipment.

In automatic control apparatus usable in flight, missile and radar systems, for example in automatic pilot systems, the signal source may actually be a signal chain from several independent signal sources, the algebraic sum of said sources providing the overall signal source for the particular control device.

Transistor amplifiers employed in the present invention may be used for preventing improper control of an aircraft by an automatic pilot system due to an electrical fault such as an open circuit in the signal chain.

In my copending application Serial No. 589,664, now abandoned, for a Monitor filed even date herewith, and assigned to the same assignee as the present invention, there is shown and described a circuit arrangement for silencing a transistor amplifier used in apparatus in the event the signal source of signal source chain should develop a fault or open circuit condition whereby stray signals which would be amplified ordinarily and result in a false signal, will be nullified.

The present application shows block 26 as amplifier apparatus to be controlled and, as in my aforementioned copending application, the control system with said apparatus, may include a variable phase motor controlled by a transistor of block 26, a coupling and gear train arrangement and a rudder for an aircraft shown herein symbolically in the drawings and are conventional components.

The present invention utilizes a transistor amplifier in a signal chain arrangement or signal generating circuit as set forth generally, in my forementioned copending patent application for a Monitor. However, in the arrangement of the present invention, when the signal chain connected with the initial amplifier develops the aforementioned fault, a circuit arrangement automatically becomes effective to actuate an indicator or standby device, or both.

It is an object of the present invention, therefore, to provide a novel circuit arrangement for actuating any ancillary device at a predetermined condition.

One of the advantages of the present arrangement is that if a faulty signal condition arises, there is provided automatically, a novel fail-safe condition for the apparatus actuable by the signal chain whereby, upon failure of equipment there remains a safe control or indication, and wherein a control device or indicator will be operated.

The signal chain open condition may operate the safety warning device, or it may actually operate standby equipment in any desirable form for producing a condition, or initiating operation of apparatus in the absence of the normal operation of the equipment controlled by the signal chain.

The present invention contemplates a device which consists primarily of circuitry surrounding a first and a second transistor for protecting any reasonable number of input stages against detrimental defects, or open circuit conditions in a multiplicity of signal sources or signal chains. The second transistor is always in oscillation to energize a relay. A dividing network in a feedback arrangement connected with the relay reduces the feedback to the oscillator, resulting in denergization of said relay. The feedback for the transistor oscillator is controlled by said first transistor, which is normally non-conducting, it being biased to cut-off condition operating as a class B amplifier. The said first transistor is maintained biased at cut-off condition as long as the signal chain is normal. When the signal chain opens, a sudden increase of power on the base of said first transistor causes the second transistor to conduct, resulting in a change in the feedback to the oscillator; thereby causing the relay to be denergized for providing any desired function.

Briefly, the invention contemplates circuitry wherein a break in a signal chain to apparatus using a transistor amplifier will cause a normally energized "fail-safe" relay to be deenergized and actuate a warning indicator or initiate operation of stand-by or control equipment.

The foregoing and other objects and advantages of the invention will appear more fully hereinfater from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawings:

Fig. 1 is a representative block diagram of a system utilizing the invention.

Fig. 2 is a schematic diagram of one form of the circuitry represented by block diagram shown in Fig. 1.

Referring to the drawings, and more particularly to Fig. 1, there is shown a signal chain 20 having a plurality of independent signal sources such as 21, 22, 23 and 24 which are connected to a transistor amplifier, represented by a block 26 bearing the legend "amplifier apparatus to be protected." The transistor amplifier or apparatus 26 is connected to a transistor amplifier 27 which is a normal "cut-off" biased transistor amplifier. The amplifier 27 is connected to a transistor oscillator 29 via the magnetic feedback network 28, with a coupling transformer 30 suppling the feedback from the transistor oscillator to said network, which network is controlled by the transistor amplifier 27.

Since the apparatus such as 26, normally generates heat, and further will be subject to varying ambient temperatures, a thermistor network 35 is connected to the amplifier 27; so that the direct current source 36 may be fed in varying amounts to the circuit in accordance with the ambient temperature.

The transistor oscillator 29, which is normally in oscillation, is connected to a rectifier 38 which converts the alternating current output from the transistor oscillator into pulsating direct current connected to the relay 37; so that said relay is normally energized providing a fail-safe condition for the device. As long as the relay is energized, the indicator or standby equipment remains in a predetermined condition, such as an inactive condition. When the relay 37 becomes de-energized due to an open condition in the signal chain, the indicator or standby equipment 40 will be actuated.

The indicator may be any suitable device such as an electric bulb which may be energized, a flag indication, or an oral signal may be provided such as an annunciator.

The schematic diagram in Fig. 2 shows a signal chain having at least two representative alternating current signal sources 21 and 22 connected to the apparatus to be protected 26, which has at least one transistor 50 therein, having a base 51, an emitter 52 and a collector 53. The base is connected via a mixing resistor 54 with the signal chain (21 and 22) which has one end thereof connected to ground or any suitable return path. Resistors 55 and 56 are connected in series across the base 51 and the collector 53, with the collector end of the series resistors being connected to a direct current source for supplying proper bias voltage for the transistor. A mid point of the transistor network 55—56 is connected via a capacitor 60 to ground. A load resistor 61 is connected from the output or emitter 52 to the transistor 27.

The arrow 62 is considered the output of the particular transistor amplifier shown associated in block 26, and would normally be connected to the succeeding stages on any apparatus to be controlled. One form of the particular apparatus represented by block 26 is set forth in detail in my aforementioned copending patent application for a Monitor. Briefly, however, the signal source or signal chain is included in the biasing network and an electrical unbalance would occur at an open condition therein so that the voltage would be increased through the remaining portion of the network whereby the output of the transistor would be suddenly increased. The summing or mixing resistor 54 is part of the biasing network for the transistor through the low impedance signal chain and the biased current is usually very low and will not affect the signal chain.

A break in the signal chain, or open circuit condition, results in a sudden increase of voltage at the emitter across the load resistor 61; so that this is impressed on the base of the transistor amplifier 27 via terminal 65. This sudden increase of bias voltage and current at terminal 65 with respect to terminal 66 will cause the D.C. amplifier 27, which is normally in a nonconducting condition, to conduct, since the base junction of the amplifier 27 will have attained a positive polarity.

A saturable reactor 70 has a core 71 with a controlling winding 72 on the center leg thereof, while a pair of controlled windings 73 and 73' are on the outer legs with said control windings being connected in series as shown. The saturable reactor is a conventional device having an E-I type core. The controlled windings 73—73' are connected in series in a manner to produce fluxes in the same direction in the center leg of the core, with one end of said windings being connected to ground and the other end thereof being connected to a terminal 75. When the transistor amplifier 27 conducts due to the increase of current resulting from the open signal chain, there will be effective current flow through the controlling winding 72 for controlling saturation of the core 70. The coupling transformer 30 has primary and secondary windings 80 and 81, respectively, with one end of the secondary winding being connected to ground, while the other end of said secondary winding is connected via a resistor 82 to terminal 75 thereby forming a feedback dividing network across the secondary or transformer 30. A tuning capacitor 83 across the primary winding 80 is used for tuning the oscillator 29, which oscillator includes a transistor 85, a base 86, an emitter 87 and a collector 88.

An impedance network includes resistors 90, 91, 92 and 93 with by-pass and blocking capacitors 95 and 96 shown connected in a conventional manner with the direct current source 36 for supplying suitable biasing voltage for transistor 85. The bridge rectifier 38 has a pair of opposed input terminals connected across the primary winding 80 with one side thereof connected to the collector 88 of the transistor 85 and with the opposite side of said rectifier connected to the D.C. source 36. The output terminals of the bridge 36 are connected to the winding of relay 37. Contact set 97 which is normally open, is connected to a voltage source 98 and a stand-by device 99, while visual and aural indicating means 100 and 101 are shown connected via a battery 102 to the contact set 103 which is also shown normally open. Contact sets 97 and 103 are represented as normally open while the relay 37 is energized.

The transistor amplifiers such as 50, 27 and 85 normally vary their own bias as a function of ambient temperatures. Consequently, a temperature voltage network such as thermistor network 35 is employed as a temperature voltage reference network used to "track" the amplifier current for amplifier such as 27 over wide ambient temperature excursions. To achieve the desired purpose, the thermistor network having impedances 105, 106 and 107 are shown connected between the direct current source 36 and the terminal 66. The thermistor network is required to maintain the reference voltage at a terminal 66 with respect to ground, equal to that at terminal 65 with respect to ground, as the temperature varies. While there are several arrow heads shown and referenced by legend "multiplicity of signal chains or source" the signal chain including sources 21 and 22 may be substantially duplicated for other sources, and connected to terminal 65. An increase in bias current by any of a group of transistor amplifiers such as 26, will result in an increase of voltage at terminal 65 with respect to the reference voltage maintained by the thermistor network 35 at terminal 66. This thermistor control will cause the base junction of the direct current amplifier 27 to go positive causing the collector 110 of amplifier 27 to conduct. The operation of transistor amplifier 27 is shown to be dependent upon the currents in apparatus 26 having transistor 50, and current flow from the temperature reference or thermistor network 35. If the currents from the amplifier-to-be-protected as shown in block 26 should materially or suddenly increase above the reference temperature current as represented by thermistor network 35, as would occur when a "fault" or open signal condition in the signal chain exists, then amplifier 27 would be set into conduction thereby varying the effect of the magnetic feedback network, including the resistor 82 and the controlled windings 73—73', and reducing the feedback voltage when transistor 27 conducts, the bias voltage source 115 connected between the emitter 116 and collector 110 via the controlling winding 72, energizes said controlling winding whereby the impedance of the saturable reactor is varied to control the magnitude of the feedback voltage. The feedback voltage which is fed to the oscillator, is controlled so that the output of the oscillator is reduced or effectively cut-off, thereby preventing further energization of relay 37. Upon de-energization of relay 37, contact set 97 will close to energize or otherwise actuate standby device 99, and normally open contact set 103 will close to actuate the indicator represented by the bulb 100 and the annunciator 101.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. A device for detecting an open condition in a signal circuit, comprising a cutoff biased amplifier, an oscillator with a magnetic feedback circuit, and means connected to the output of said oscillator for indicating an open signal circuit, said cutoff biased amplifier being connected to the signal circuit and being connected to the magnetic feedback circuit, and said cutoff biased amplifier being conductive upon an open signal circuit condition to control the operation of said oscillator.

2. A device as claimed in claim 1 wherein said means connected to the output of said oscillator includes a stand-by circuit.

3. In a control system, a signal generating circuit adapted to provide a signal and subject to an open condition, an amplifier connected to said signal circuit for amplifying the signal, and means connected to said amplifier for detecting an open condition in said signal circuit, said means including an amplifier biased to cutoff and conductive at an open signal circuit condition and an oscillator responsive to current flow from said cutoff biased amplifier, and means connected to said oscillator for indicating an open signal circuit condition.

References Cited in the file of this patent

UNITED STATES PATENTS

| | | |
|---|---|---|
| 2,547,011 | Jacobsen | Apr. 3, 1951 |
| 2,568,172 | Spencer | Sept. 18, 1951 |
| 2,651,021 | Hays | Sept. 1, 1953 |
| 2,700,759 | Ogle et al. | Jan. 25, 1955 |
| 2,703,877 | Stoff et al. | Mar. 8, 1955 |
| 2,751,578 | Johannesson | June 19, 1956 |
| 2,764,753 | Martin | Sept. 25, 1956 |
| 2,782,404 | Bergman | Feb. 19, 1957 |
| 2,817,071 | Smith | Dec. 17, 1957 |
| 2,817,074 | Faulkner | Dec. 17, 1957 |